United States Patent
Libby

Patent Number: 6,049,756
Date of Patent: Apr. 11, 2000

[54] SYSTEM AND METHOD FOR AVOIDING COLLISION BETWEEN VECTOR AND SOLID OBJECTS

[75] Inventor: Vibeke Libby, San Mateo, Calif.

[73] Assignee: Lockheed Martin Corporation, Sunnyvale, Calif.

[21] Appl. No.: 08/968,994

[22] Filed: Nov. 12, 1997

[51] Int. Cl.⁷ ...................................................... G01S 7/78
[52] U.S. Cl. .......................... 701/301; 701/25; 701/206; 395/90; 318/587; 340/436
[58] Field of Search .................. 701/25, 26, 28, 701/209, 206, 226, 300, 301, 302; 340/436; 318/587

[56] References Cited

U.S. PATENT DOCUMENTS

| | | | |
|---|---|---|---|
| 3,737,902 | 6/1973 | O'Hagan et al. | 342/431 |
| 4,317,119 | 2/1982 | Alvarez | 342/455 |
| 5,056,031 | 10/1991 | Nakano et al. | 701/301 |
| 5,150,026 | 9/1992 | Seraji et al. | 318/568.11 |
| 5,150,452 | 9/1992 | Pollack et al. | 701/301 |
| 5,229,941 | 7/1993 | Hattori | 701/26 |
| 5,349,533 | 9/1994 | Libby | 701/301 |
| 5,608,392 | 3/1997 | Faivre | 340/967 |

*Primary Examiner*—William A. Cuchlinski, Jr.
*Assistant Examiner*—Gertrude Arthur
*Attorney, Agent, or Firm*—Pennie & Edmonds LLP

[57] ABSTRACT

An apparatus for analyzing a specified path A-B with respect to a specified obstacle determines if the path intersects the obstacle and determines a collision avoidance path when the path is determined to intersect the obstacle. The apparatus is preferably a dedicated path analyzer that provides high speed path analysis support to a host computer performing navigation functions. The path analyzer includes a collision detector and a collision avoidance path generator. The path analyzer receives from the host computer coordinates representing the specified path's first and second endpoints (A and B) in three dimensional space and the specified obstacle's physical extent. The collision detector generates a preliminary result signal indicating whether the specified path does not intercept the specified obstacle, unavoidably intercepts the specified obstacle, or avoidably intercepts the specified obstacle. When the preliminary result signal indicates that the specified path avoidably intercepts the specified obstacle, the collision avoidance path generator selecting a vertex (C) of a parallelepiped corresponding to the specified obstacle's physical extent, such that a modified path A-C-B from the first specified path endpoint to the selected vertex to the second specified path endpoint circumnavigates the obstacle. The path analyzer returns signals to the host computer representing the preliminary result signal and, when the preliminary result signal indicates that the specified path avoidably intercepts the specified obstacle, the selected vertex.

18 Claims, 9 Drawing Sheets

SYSTEM AND METHOD FOR AVOIDING COLLISION BETWEEN VECTOR AND SOLID OBJECTS

The present invention relates generally systems and methods for determining whether a specified path or line is space is intersected by a specified object and for avoiding determining a best for path for avoiding a collision, and particularly to systems for solving collision checking and avoidance problems at very high speed.

BACKGROUND OF THE INVENTION

There are numerous circumstances in which it is useful to determine if a specified path is blocked by a specified obstacle. For example, in robotics, the system may need to find a clear path through a known terrain to a specified destination. This would apply equally well to a fixed position robot with a moveable arm as to a moveable robot. For instance, the outer boundary of a robot arm can be represented by a set of line segments representing the arm's "wire frame", and for any given arm position or future arm position intersection of any of those line segments with a known object indicates that movement of the robot arm to that position would cause a collision.

Other applications include checking an airplane's proposed trajectory against a known terrain and/or set of obstacles, and hidden line calculations for video display systems.

In most circumstances in which path blockage determination is useful, it is also useful to determine a path to get past a particular obstacle. For instance, if it is determined that an airplane's planned route or current heading is blocked by an obstacle, the next problem is to determine a path for avoiding the obstacle. One approach would be to randomly select alternate paths centered around the ordinal path until one is found that does not intersect the obstacle. More constructively, one could attempt to determine a path to an external edge or corner of the obstacle that is closest to the original path and that does not intersect with the obstacle. However, determining that best path using a general purpose computer is too slow for some applications, such as situations where there are dozens, hundreds or even thousands of obstacles to be avoided by a fast moving vehicle.

The present invention provides a fast solution to the question: given a starting point and a destination point in space and an obstacle, what is a good path for getting from the starting point to the destination point while avoiding a collision with the obstacle?

Path blockage analysis is usually accomplished using a general purpose a computer programmed to perform a series of mathematical calculations. In U.S. Pat. No. 4,764,873, dedicated hardware is used to analyze the relationship between a path and an obstacle by converting path and obstacle data into a form suitable for fast analysis and then performing a set of comparisons that sort the path into one of three classes: path obstructed (called a Hit), path clear (called a Miss), or path may be blocked (called Ambiguous). If the initial analysis is ambiguous, U.S. Pat. No. 4,764,873 teaches that the two dimensional path blockage problem can be resolved by performing slope comparison computations. However, for three dimensional path checking problems, the amount of computation required to resolve such ambiguities is considerable. In particular, the technique of the '873 patent to resolve ambiguities for a three-dimensional path is to evaluate a set of planes, one of which contains an object edge and one of the two path end points. Then the second end point of the path is evaluated with respect to which side of this plane the point is situated. In the worst case, ambiguity resolution requires evaluation of one path point with respect to twelve planes, each evaluation requiring computation of the determinant of a 3×3 matrix. The sign of the resulting determinant indicates which side of a given plane the point in question is located. When the point has been evaluated with respect to all twelve planes, an additional set of logical conditions have to be tested in order to detect an intersection.

U.S. Pat. No. 5,349,533 improves on U.S. Pat. No. 4,764,873 by providing an apparatus and method for minimizing the number of computations required to resolve three dimensional path blockage determinations that are not resolved by the first stage path analyzer hardware. One aspect of minimizing computations is to use an improved coordinate mapping (or labeling) method that facilitates identification of the minimum number of object planes that need to be checked for intersection by a specified line segment. The number of planes to be checked in the worst case is three and in many cases the number of planes to be checked is one or two. Also, instead of requiring the computation of determinants, U.S. Pat. No. 5,349,533 requires computation of no more than four relatively simple linear equations for each plane to be checked.

The present invention extends the technology of U.S. Pat. No. 5,349,533 to provide a system and method for computing a collision avoidance path in a very small number of computational clock cycles. By using several parallel path analyzer units, the time required to compute a path though a field of many obstacles can be greatly reduced.

It is therefore a primary object of the present invention to provide a collision-avoidance path determination system and method that performs three dimensional path analyses substantially faster than it would take a conventional computer to perform the same analyses.

Another object of the present invention is to provide a blockage avoidance analysis system which simultaneously performs a set of computations for selecting an obstacle avoidance path.

SUMMARY OF THE INVENTION

In summary, the present invention is an apparatus and method for analyzing a specified path A-B with respect to a specified obstacle to determine if the path intersects the obstacle and to determine a collision avoidance path when the path is determined to intersect the obstacle. The apparatus is preferably a dedicated path analyzer that provides high speed path analysis support to a host computer performing navigation functions. The path analyzer includes a collision detector and a collision avoidance path generator. The path analyzer receives from the host computer coordinates representing the specified path's first and second endpoints (A and B) in three dimensional space and the specified obstacle's physical extent. The collision detector generates a preliminary result signal indicating whether the specified path does not intercept the specified obstacle, unavoidably intercepts the specified obstacle, or avoidably intercepts the specified obstacle. When the preliminary result signal indicates that the specified path avoidably intercepts the specified obstacle, the collision avoidance path generator selecting a vertex (C) of a parallelepiped corresponding to the specified obstacle's physical extent, such that a modified path A-C-B from the first specified path endpoint to the selected vertex to the second specified path endpoint circumnavigates the obstacle. The path analyzer returns signals to the host computer representing the preliminary result signal and, when the preliminary result signal indicates that the specified path avoidably intercepts the specified obstacle, the selected vertex.

The collision avoidance path generator includes a path endpoint classifier for classifying each of the first and second path endpoints with respect to the specified object so as to produce first and second path endpoint sector values. Each sector value indicates which of 27 sectors of space, defined with respect to the specified object, the corresponding path endpoint is located in. A lookup table, addressed in accordance with the first and second path endpoint sector values, returns a first vertex selection value and a return code. The selected vertex corresponds to the returned first vertex selection value when the return code has a first predefined value.

An ambiguity resolver circuit is activated when the return code is any one of a predefined set of operation codes, each of which corresponds to a respective ambiguity resolution computation. The ambiguity resolver circuit performs the ambiguity resolution computation corresponding to the return code returned by the lookup table so as to generate a second vertex selection value. The selected vertex corresponds to the second vertex selection value when the return code is any one the predefined set of operation codes.

In a preferred embodiment the ambiguity resolver circuit includes a math unit for performing mathematical and logical operations, and a state machine for directing the math unit to perform a sequence of mathematical and logical operations on values corresponding to the coordinates of the specified path endpoints and the specified obstacle's physical extent. The sequence of mathematical and logical operations correspond to the return code returned by the lookup table.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
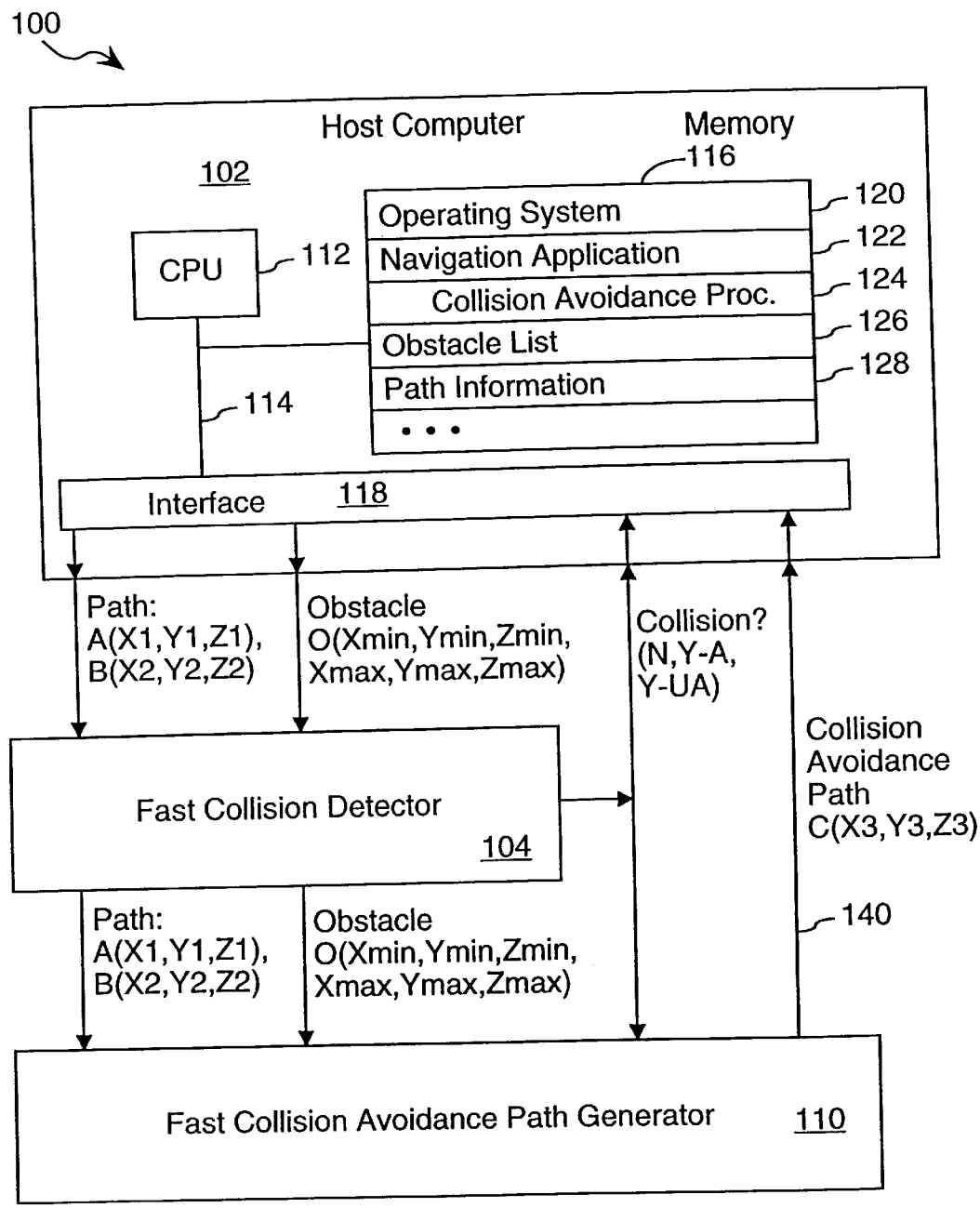
FIG. 1 is a block diagram of a computer system incorporating the present invention.

Referring to FIG. 1, there is shown a navigation system 100 or computer system incorporating the fast collision avoidance path generator of the present invention. The system includes a host computer 102, a fast collision detector 104 and a fast collision avoidance path generator 110. The host computer 102 includes a central processing unit (CPU) 112 coupled by one or more internal busses 114 to memory 116 and an interface 118. The interface 118 provides data paths between the host computer and the fast collision detector 104 and fast collision avoidance path generator 110.

The memory 116 preferably includes both high speed, random access memory (RAM) and non-volatile memory such as disk storage. The memory 116 stores:

an operating system 120, providing basic system capabilities, including file storage, message transmission and receipt services, and so on;

a navigation application program 122, such as a navigation application program for providing navigation services to the mobile unit in which the system 100 is housed;

a collision avoidance procedure 124, typically called by the navigation application to locate collision free paths between specified pairs of locations;

an obstacle list 126, specifying the locations and extent or size of a set of known obstacles; and path information 128, such as a sequence of linear paths, or set of alternative paths.

The fast collision detector 104, which is preferably implemented in accordance with U.S. Pat. No. 5,349,533, receives path and obstacle information from the host computer and returns signals indicating whether or not traveling along a specified path would cause a collision with a specified obstacle. The fast collision detector 104 preferably determines whether or not a collision condition exists for each path/obstacle pair within a very small number of processor cycles (preferably less than ten) for the host computer system, enabling the host computer to receive collision results from the fast collision detector 104 approximately as fast as it can send path/obstacle pairs to the fast collision detector 104 to be analyzed.

In a preferred embodiment, when a collision condition is detected by the fast collision detector 104, the collision result signal is transmitted not only to the host computer 102, but also to the fast collision avoidance path generator 110.

The fast collision avoidance path generator 110 receives a path/obstacle pair, either from the host computer or the fast collision detector 104, and computes a collision avoidance path that is communicated back to the host computer on bus 140. Since the path to be analyzed is specified by start and end points A(X1, Y1, Z1) and B(X2, Y2, Z2), the collision avoidance path can be specified by a single point C(X3, Y3, Z3), representing the piecewise linear collision avoidance path A-to-C, C-to-B, sometimes denoted as A-C-B or as A-C, C-B.

Representing Position of Path and Obstacles In 3D Space

Figure 2:
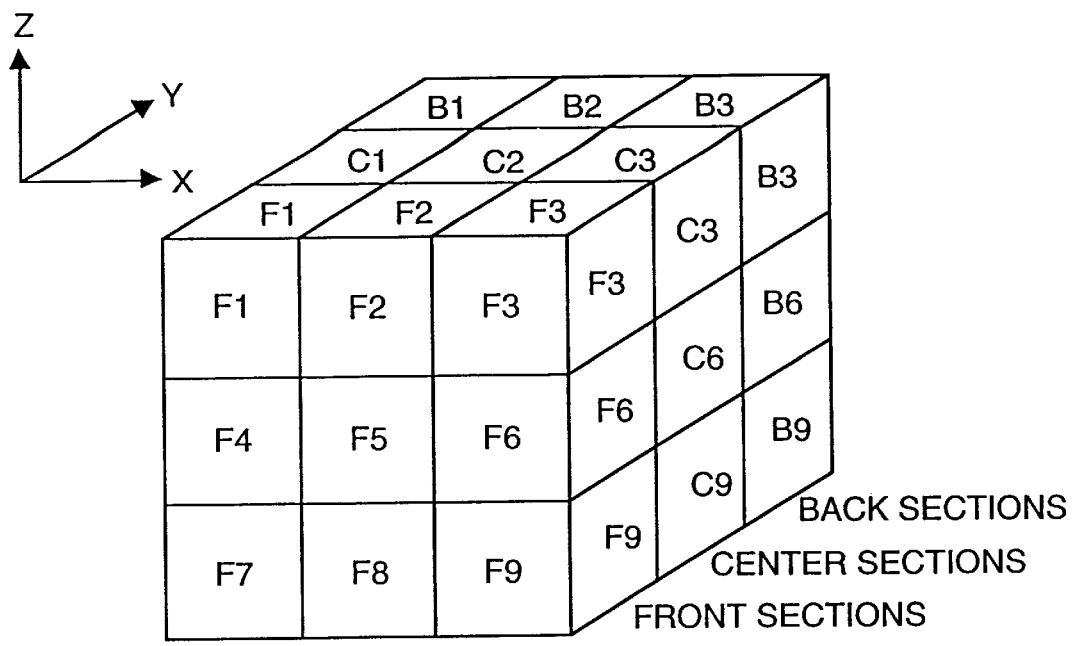
FIG. 2 depicts the way three dimensional space is divided into twenty-seven sections for analyzing three dimensional paths.
Figure 3:
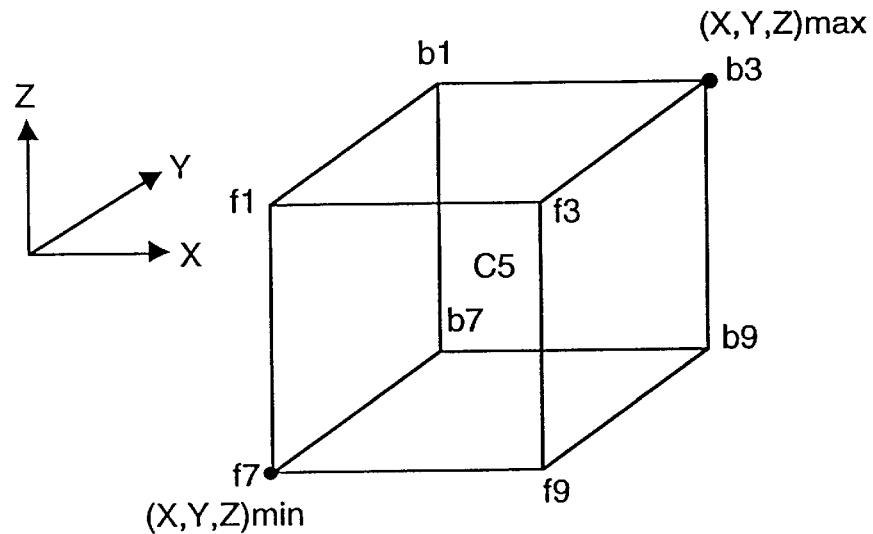
FIG. 3 shows the names assigned to the eight corners of a three dimensional rectangular parallelepiped, which is used during obstacle avoidance determination to approximate a specified three dimensional obstacle.

Referring to FIGS. 2 and 3, for the purpose of analyzing a path, all of three dimensional space is divided into twenty-seven sections, herein labeled F1–F9 (for the front nine sections), C1–C9 (for the center nine sections) and B1–B9

(for the back nine sections). Section C5 is a rectangular parallelepiped (i.e., a rectangular three dimensional box-shaped solid region) that totally encloses a specified object, and is bounded in the X, Y and Z directions by the minimum and maximum X, Y, and Z coordinates of the object (Xmin, Ymin, Zmin) and (Xmax, Ymax, Zmax). Since FIG. 2 represents all of space, the surrounding regions actually extend infinitely in directions facing away from section C5. For instance, region F3 is actually unbounded in the +X, −Y and +Z directions.

For the purposes of explaining the operation of the path analyzer's circuitry, the eight corners of region C5 are labeled as f1, f3, f5, f9, b1, b3, b5, b9 as indicated in FIG. 3. The corner names are the lower case versions of the names of the corner regions F1, F3, etc., which are adjacent to the eight corners of region C5.

Fast Collision Avoidance Path Generator

Figure 4:
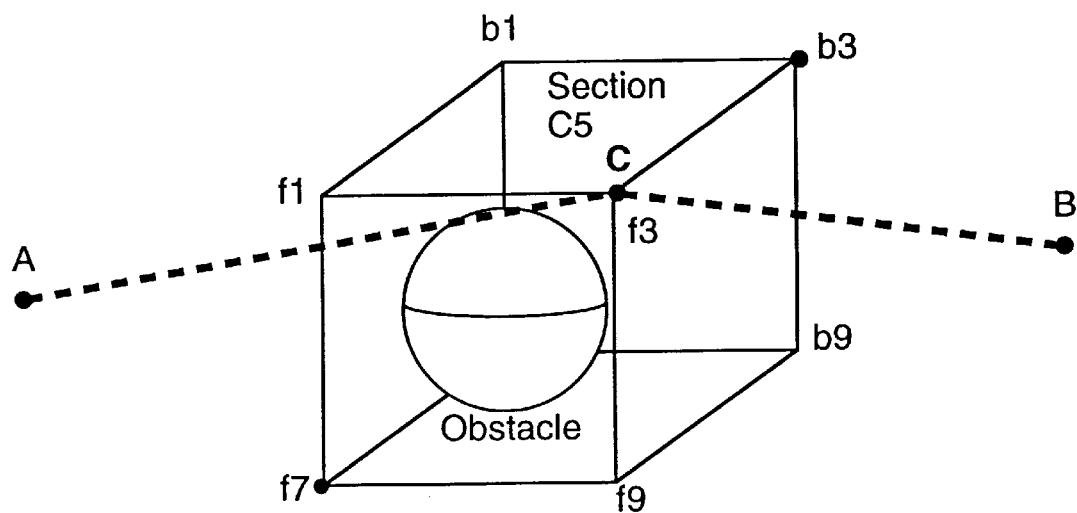
FIG. 4 depicts a typical collision avoidance path generated by the fast collision avoidance path generator of the present invention.

Referring to FIG. 4, the problem to be solved is represented by a rectangular box in space that (A) encloses a specified obstacle, and (B) blocks the straight line path between points A and B. In general, unless the path ends are in opposing face sectors (e.g., F5 and B5) or one of the two path ends is in sector C5, there will always be a collision avoidance path A-C-B where C is one of the eight vertices of sector C5 (represented by the rectangular box in FIG. 4). In fact, in some situations, there will be two, four or even six distinct collision avoidance paths between A and B traveling through different vertices of sector C5. In FIG. 4, the collision avoidance path travels through vertex f3 of section C5.

The function of the fast collision avoidance path generator 110 is to select the shortest (i.e., optimal) of the available collision avoidance paths that travel through a sector C5 vertex. When two of the collision paths are of equal length, either can be selected as the shortest path. Clearly, in some situations the shortest collision avoidance path will travel through a point on one of the edges of sector C5 that is between two vertices. In the preferred embodiment, fast collision avoidance path generator 110 does not determine collision avoidance paths that travel through sector C5 edge positions other than vertices.

Figure 5:
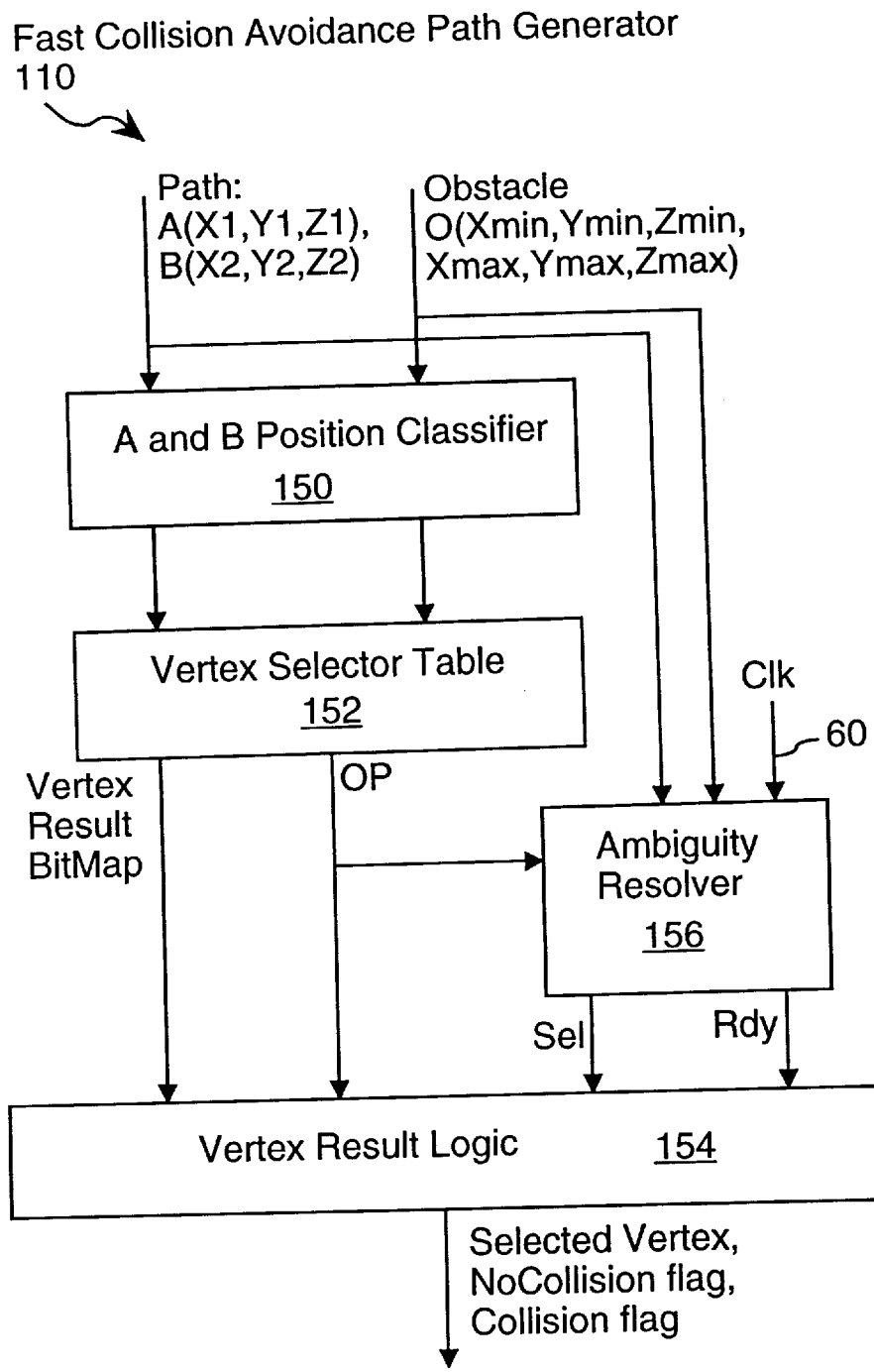
FIG. 5 is a block diagram of a fast collision avoidance path generator.

Referring to FIG. 5, there is shown a preferred implementation of the fast collision avoidance path generator 110. It should be noted that the fast collision avoidance path generator 110 is not invoked unless the fast collision detector 104 has already determined that the specified path A-B intersects the specified obstacle O(Xmin, Ymin, Zmin, Xmax, Ymax, Zmax) and that a collision with the obstacle is not "unavoidable". As a result, the only job to be performed by the fast collision avoidance path generator 110 is to select a point C on the surface of section C5 (i.e., the parallelepiped enclosing the obstacle) for which the path A-C-B will not intersect section C5, other than at the one point C. More specifically, the fast collision avoidance path generator 110 selects one of the eight vertices of sector C5 and outputs its coordinates as point C of the collision avoidance path A-C-B. In an alternate embodiment (see the Alternate Embodiments section of this document), for certain paths where a collision cannot be avoided by traveling through a single vertex of sector C5, the fast collision avoidance path generator 110 selects two of the eight vertices of sector C5 and outputs their coordinates as points C and D of the collision avoidance path A-C-D-B.

The fast collision avoidance path generator 110 includes:

a path end position classifier 150 for determining the space sector associated with each of the specified path end points A and B;

a vertex selector table 152, which is a lookup table that receives the A and B sector classifications for the specified path, and outputs either (A) a selected vertex indicator in the form of a vertex result bitmap and a "null" return code (indicating that no additional computations are needed), or (B) a vertex result bitmap indicating the set of vertices that are possible choices for the collision avoidance path, and a return code that functions as an operation code (denoted as "OP" in Table 1) specifying a computation to be performed by an ambiguity resolver circuit 156 to select the collision avoidance vertex;

an ambiguity resolver circuit 156 that is used to select a collision avoidance path when a simple table lookup based on the sector classifications of the path ends is not sufficient to determine the optimal collision avoidance path; and vertex result logic 154 for receiving a vertex result bitmap from the vertex selector table 152 and selection (sel) and "result ready" (rdy) signals from the ambiguity resolver circuit 156, and for generating a signal representing the selected section C5 vertex, a No Collision flag if the specified path does not intersect the specified obstacle, and a Collision flag if the specified path has an endpoint in section C5 or the specified obstacle cannot be circumvented by traveling through a single vertex of section C5.

The path end position classifier 150 simply encodes each of the specified path end points A and B as belonging to one of the space sections shown in FIG. 2. For instance, path end A may be mapped to section F4 and path end B may be mapped to section B6. Each space section classification is preferably represented by a five or six bit value. The particular section classification encoding method can vary from one implementation to another. A six bit space section encoding scheme used in a preferred embodiment is shown in Table 1.

TABLE 1

| Section | Map Value | Section | Map Value | Section | Map Value |
|---------|-----------|---------|-----------|---------|-----------|
| F1 | 000011 | C1 | 001011 | B1 | 001111 |
| F2 | 100011 | C2 | 101011 | B2 | 101111 |
| F3 | 110011 | C3 | 111011 | B3 | 111111 |
| F4 | 000010 | C4 | 001010 | B4 | 001110 |
| F5 | 100010 | C5 | 101010 | B5 | 101110 |
| F6 | 110010 | C6 | 111010 | B6 | 111110 |
| F7 | 000000 | C7 | 001000 | B7 | 001100 |
| F8 | 100000 | C8 | 101000 | B8 | 101100 |
| F9 | 110000 | C9 | 111000 | B9 | 111100 |

The path end position classifier 150 is preferably implemented using a set of comparators and to convert the signals produced by the comparators into sector classification signals. Since the path end position classifier 150 uses simple, flow through logic, it generates the A and B classification signals in less than one system clock cycle. In fact, depending on the duration of the system clock cycle and the speed of the comparison logic used in the position classifier 150, the speed of the lookup table circuitry in the vertex selector table 152 and the speed of the vertex result logic, the selection of a collision avoidance vertex can be completed in a single clock cycle whenever the ambiguity resolver is not needed.

When the path end classification method used by the collision avoidance path generator is the same as the path end classification method used by the collision detector, the path end position classifier 150 may be eliminated and the two path classification values obtained directly from the collision detector. This alternate methodology reduces circuitry and helps to speed operation of the collision avoidance path generator by eliminating a computational operation.

The Vertex Selector Table

The A classification value is used to select a sub-table in the vector selection table, and the B classification value is used to select a row (sometimes called a record) within the selected sub-table.

The vertex selector table 152, at least conceptually, contains twenty-seven sub-tables, one for each possible sector classification of path end A. Two thirds (i.e., eighteen of the sub-tables) of the vertex selector table 152 are shown in Table 2 of this document. It should be noted that the nine sub-tables for A=B1 to A=B9 are identical to the sub-tables shown for A=F1 to A=F9, except that the vertex outcomes must be swapped for f1/b1, f3/b3, f7/b7 and f9/b9. Also, the vertex selection equations for the B1 to B9 sub-tables are adjusted to take into the account the opposite direction of the path with respect to the Y axis.

Table 2 is actually a diagrammatic representation of both the vertex selector table 152 and the operations performed by the ambiguity resolver 156. The vertex selector table 152 actually stores just two values for each A/B classification pair: an eight-bit vertex BitMap, and an Operation code. In Table 2, an "X" in any of the eight "vertices" columns indicates that vertex marked by the X is the selected vertex for collision avoidance, unless there an "IF" condition denoted in the IF column of the table. Whenever there is a non-null entry in the IF column of Table 2, that indicates that the Operation code for that entry will cause the Ambiguity Resolver 156 to execute one or more computations to select a vertex. If the Operation code in the Vertex Selector Table is a predefined "null" value (e.g., 00, represented by the "NUL" symbol in Table 2), the selected collision avoidance vertex is represented by the vertex result bitmap output by the vertex selector table 152. Otherwise, the selected collision avoidance vertex is determined by a selection signal Sel output by the Ambiguity Resolver 156. In some embodiments the Sel signal output by the Ambiguity Resolver 156 directly represents the selected vertex, while in other embodiments the Sel signal must be combined with the vertex result bitmap output by the vertex selector table 152 to determine the selected vertex (i.e, the Sel signal selects one of the vertices represented by the vertex result bitmap from the vertex selector table 152).

If Table 2 contains a single record or entry for an A/B pair, then there will be a vertex indicated in the ELSE column, in which case the vertex indicated by the X (i.e., by the vertex BitMap) is the selected collision avoidance vertex only if the IF condition is True. The vertex specified in the ELSE column is the selected vertex for collision avoidance only when the IF condition is False.

If Table 2 contains more than one record for a particular A/B path, such as for the A=F1, B=Bg path, the IF condition in only one of the records will be True and the X in the record whose IF condition is True indicates which vertex is to be selected for collision avoidance. However, the multiple IF conditions shown in Table 2 actually represent computations and comparisons performed by Ambiguity Resolver 156 in accordance with the operation code (denoted as OP in Table 2) for that A/B path. The operation code for each A/B path is denoted in Table 2 by the corresponding symbol in the OP column.

The same operation code is used for each pair of A/B paths that use the exact same "pattern" of computations for ambiguity resolution. In each case, however, the results of the computations are applied to select a collision avoidance vertex based on a pattern of outcomes that depends on the positions of the A and B path ends.

The following symbols are used in the IF condition column of Table 2:

AX, AY, AZ refer to the x, y and z coordinates path end A;

BX, BY, BZ refer to the x, y and z coordinates path end B;

MX, MY, MZ refer to the x, y, and z coordinates of the center (or centroid) of sector C5;

G means greater than, GE means greater than or equal to;

L mean less than, and LE means less than or equal to; and

AND means the boolean (or logical) AND operation.

Except for a few exemplary entries for the F1, F2, F5 and C5 sub-tables, Table 2 does not show any of the entries in the vertex selector table 152 for A/B pairs that:

represent paths (such as F1–F2) that do not intercept section C5;

represent a path (such as F1–C5) having an endpoint in section C5, in which case a collision cannot be avoided; or represent a path (such as F5–B5) for which a collision avoidance path cannot be formed by traveling through a single vertex of section C5.

In one preferred embodiment, for paths that do not intercept section C5, the vertex selector table 152 stores a null vertex bitmap and a special "NOC" Operation code that indicates to the vertex result logic to output a "No Collision" flag. For paths that have an endpoint in section C5, the vertex selector table 152 stores a null vertex bitmap and a special "COL" Operation code that indicates to the vertex result logic to output a "Collision" flag. For those paths (i.e., F5–B5, C2–C8 and C4–C6) for which a collision free replacement cannot be formed by traveling through a single vertex of section C5, the vertex selector table 152 stores a null vertex bitmap and a special "COL" Operation code that indicates to the vertex result logic to output a "Collision" flag.

In another preferred embodiment, in which it is assumed that the collision avoidance path generator does not receive paths that do not intersect the specified obstacle and does not receive paths that unavoidably intersect the specified obstacle, the vertex selector table 152 does not store any values for such paths. Rather, using well known sparse table storage techniques, the vertex selector table 152 stores values only for paths that represent avoidable collisions with the specified obstacle. Table 2 also has two columns indicating the "sector type" of each path end. In particular, each sector path end is classified as being in a vertex (V) sector (i.e., one of the corner sectors), a face (F) sector (F5, C6, B5, C4, C2 or C8), an edge (E) sector (F2, F4, F6, F8, B2, B4, B6, B8, C1, C3, C7 or C9); or in the center (C) sector (C5). These two sector type values are not actually stored in the vector selector table 152, but are useful for determining the methodology required to select a best collision avoidance vertex.

The little "o's" in Table 2 correspond to other vertices that could be used to form a path that avoids a collision with the obstacle, but would result in a longer path.

The operation codes in the vertex selector table, other than the NUL, NOC and COL codes, indicate not only the computations to be performed by the ambiguity resolver, but also the way the ambiguity resolver maps the results of the computation to a vertex selection. The NUL, NOC and COL codes all indicate that the ambiguity resolver is not to perform any operation for the current path/obstacle pair. The operation codes starting with the letter "A" in the vertex selector table indicate computations required to select between two vertex candidates; the operation codes starting with the letter "B" in the vertex selector table indicate computations required to select between four vertex candidates; and the operation codes starting with the letter "C" in the vertex selector table indicate computations required to select between six vertex candidates.

The vertex result logic 154 outputs a signal representing a selected collision avoidance vertex, a No Collision flag, and a Collision flag. If the operation code output by the vertex selector table 152 is the NUL operation code, the vertex result logic 154 outputs a vertex selection signal corresponding to the vertex result bitmap output by the vertex selector table 152 and neither of the No Collision and Collision flags are asserted. If the Operation code output by the vertex selector table 152 is the COL operation code, the vertex result logic 154 outputs an asserted Collision flag, a de-asserted No Collision flag and a vertex selection signal corresponding to the vertex result bitmap output by the vertex selector table 152. If the operation code output by the vertex selector table 152 is the NOC operation code, the vertex result logic 154 outputs an asserted No Collision flag, a de-asserted Collision flag and a vertex selection signal corresponding to the vertex result bitmap output by the vertex selector table 152.

Otherwise, for any other operation code output by the vertex selector table 152, the vertex result logic 154 outputs a vertex result bitmap corresponding to the vertex selection signal output by the ambiguity resolver 156 when the ambiguity resolver's Rdy signal is asserted.

Ambiguity Resolver

Figure 6:
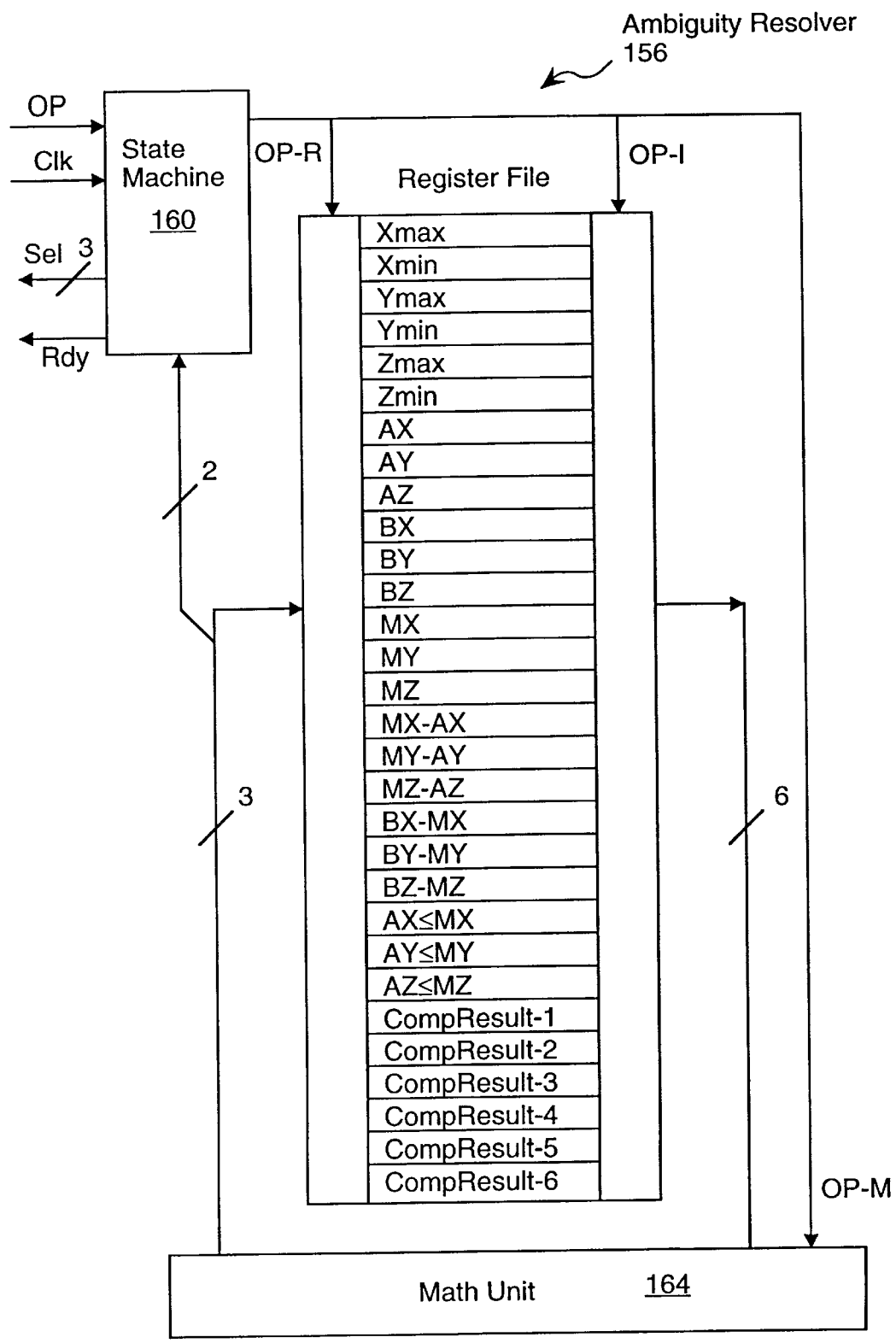
FIG. 6 is a block diagram of an ambiguity resolver used in the fast collision avoidance path generator of FIG. 5.

Referring to FIG. 6, in one preferred embodiment the ambiguity resolver 156 consists of a state machine 160 that outputs a sequence of microcode instructions for controlling the use of a register file 162 and a math unit 164. The register file 162 contains slots for storing:

the coordinates of the obstacle (sector C5), denoted as Xmax, Xmin, Ymax, Ymin, Zmax, Zmin;

the coordinates of the two path ends, denoted as AX, AY, AZ, BX, BY, BZ;

the computed coordinates of the obstacle's center, MX, MY, MZ;

intermediate computed results, each of which represents the difference between a path end coordinate and the corresponding coordinate of the obstacle center, denoted as MX-AX, MY-AY, MZ-AZ, BX-MX, BY-MY, BZ-MZ;

three comparison results used to resolve vertex selections when there are only two candidate vertices, denoted as AX<MX, AY8<MY, AZ<MZ; and six comparison results used to resolve vertex selection when there are four or six candidate vertices.

In some embodiments the path's end coordinates and the obstacle coordinates may be "available" from a data bus, avoiding the need to store these values in a register file.

Not all of the register file slots are used by every ambiguity resolution computation. In the preferred embodiment, the obstacle and end point coordinates are loaded into the register file in a single clock cycle, at which time the Operation code is also received from the vertex selector table 152.

The state machine outputs three microcode values during each operative cycle of the ambiguity resolver:

OP-I, which specifies up to six register file slots (or other data input values) to be coupled to and used as inputs to the math unit 164;

OP-M, which are a set of enable flags for selective enabling computational circuits within the math unit 164; and OP-R, which specifies up to three register file slots to receive values computed by the math unit 164.

Two of the values computed by the math unit 164 can be received by the state machine 160. In particular, when the math unit 164 computes comparison values corresponding to specific potential vertex selections, the state machine stops the computation and outputs a result as soon as any of the comparison values indicates that the best collision avoidance vertex has already been identified. In some cases, the state machine 160 can terminate a computation two clock cycles before the full set of computations for a particular Operation code are completed.

Math Unit

Figure 7:
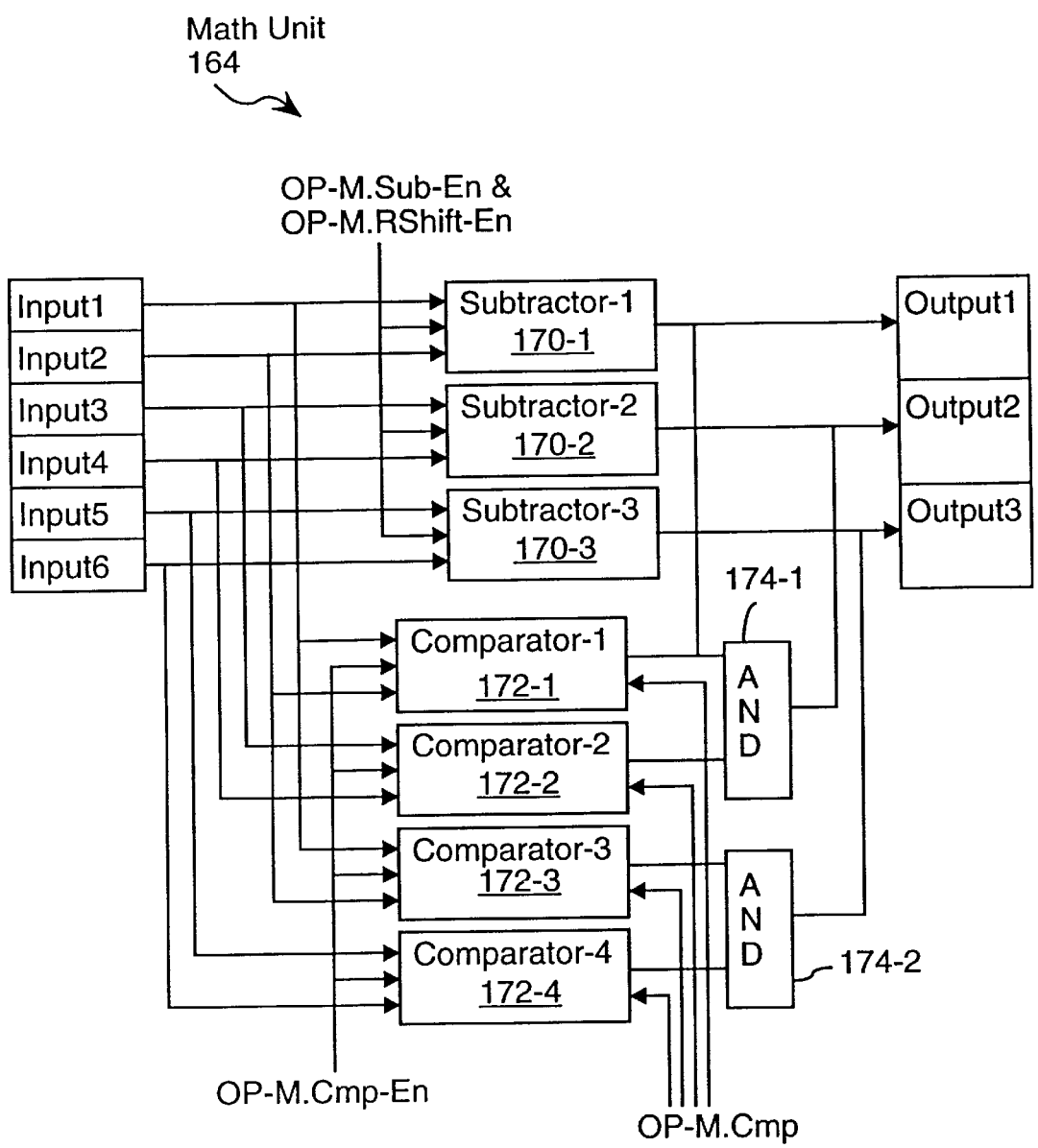
FIG. 7 is a block diagram of math unit used in the ambiguity resolver of FIG. 6.

Referring to FIG. 7, in the preferred embodiment corresponding to the ambiguity resolver shown in FIG. 6, the math unit 164 consists of three parallel subtractors 170-1, 170-2, 170-3; four parallel comparators 172-1 through 172-4, and two AND gates a 174-1 and 174-2. The comparators 172 each output a one bit flag value and the two AND gates 174 logically AND the outputs of the first and second comparators to generate a first output value and the third and fourth comparators to generate a second output value.

The three subtractors 170 are each standard subtraction circuits, with added circuitry for optionally right shifting the result of the subtraction operation by one bit position so as to divide the result by two.

The OP-M microcode value includes several subfields:

OP-M.Sub-EN is a three bit vector for selective enabling operation of the three subtractors 170;

OP-M.Sub-EN is a three bit vector for selective enabling operation of the right shift operation by each of the three subtractors 170;

OP-M.Cmp-En is a four bit vector for selective enabling operation of the four comparators 172; and OP-M.Cmp is a four bit vector for specifying the comparison operation to be performed by each of the four comparators 172. The only comparison operations performed by the comparators are I1>I2, I1≧I2, I1<I2 and I1≦I2, where I1 and I2 are the first and second inputs to a comparator 172. The boolean results computed by each pair of comparators 172 are combined by a corresponding AND gate 174.

In summary, the preferred embodiment of the math unit 164 can perform up to three simultaneous subtractions (with or without dividing the result by two) or up to four simultaneous numeric comparisons and logically ANDing the results of the comparisons in a single clock cycle. In the "worst case," the ambiguity resolver determines a best collision avoidance vertex in six computational clock cycles using the math unit embodiment shown in FIG. 7.

Figure 10:
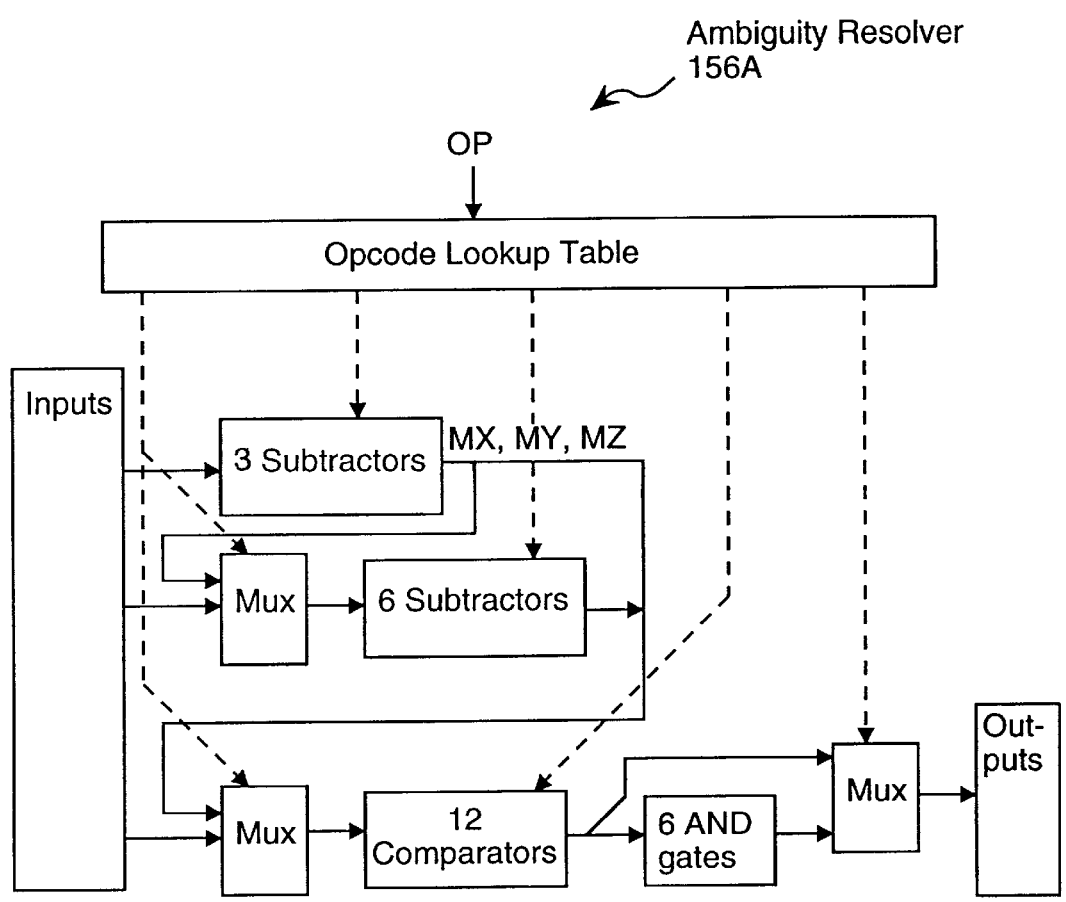
FIG. 10 is a block diagram of an alternate embodiment of the ambiguity resolver used in the fast collision avoidance path generator of FIG. 5.

In an alternate embodiment of the ambiguity resolver 156A, shown in FIG. 10, greater computational speed is achieved by increasing the number of subtractors and comparators. For instance, by using nine parallel subtractors (with the outputs of three of the subtractors being coupled to the inputs of other ones of the subtractors), twelve comparators (with the outputs of the subtractors coupled to the inputs of the comparators) and six AND gates, the number of clock cycles required to resolve ambiguities and select a best collision avoidance vertex can be reduced, even in the worst case, to one.

Path Checking and Correction Process

Figure 8:
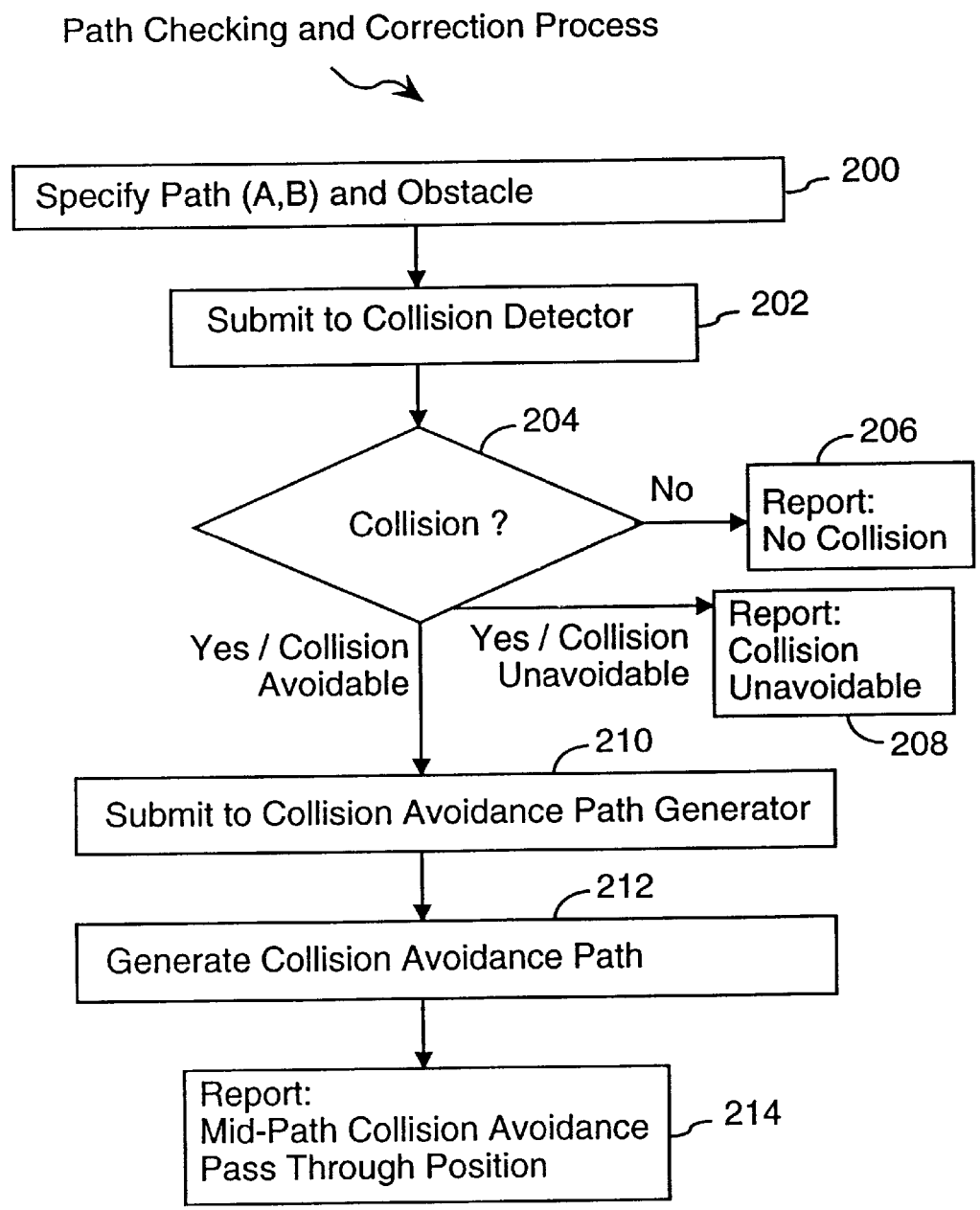
FIG. 8 is a flow chart of a path checking and correction process.

Referring to FIG. 8, the path checking and collision avoidance method used by the apparatus shown in FIG. 1 is as follows. The host computer specifies the coordinates of a path A-B and an obstacle (step 200) and transmits those coordinate values to the fast collision detector (step 202). If a collision is not detected by the fast collision detector (204-N), a No Collision report is returned to the host computer (step 206).

If an "unavoidable collision" is detected by the fast collision detector (204-Y/CU), an Unavoidable Collision report is returned to the host computer (step 208). In the preferred embodiment, an Unavoidable Collision report is returned to the host computer when either (A) either end of the specified path is inside the sector C5 parallelepiped surrounding the specified obstacle, or (B) there is no way to avoid the obstacle by traveling through a single vertex of sector C5.

In an alternate embodiment, for paths that cannot modified to avoid the obstacle by traveling through a single vertex of sector C5, a different "result flag" indicates the need for a two-vertex avoidance path is returned to the host computer. The only A-B paths to which this applies are F5–B5, C4–C6 and C2–C8 (and their inverses). The set of selectable collision avoidance paths for F5–B5 are: A-f1-b1-B, A-f3-b3-B, A-f7-b7-B and A-f9-b9-B. The best of these paths is a function of the distance of path end A from each of the f1, f3, f7 and f9 vertices and the distance of path end B from each of the b1, b3, b7 and b9 vertices.

If an avoidable collision is detected by the fast collision detector (204-Y/CA), an Avoidable Collision report is returned to the host computer and the collision avoidance problem is submitted to the collision avoidance path generator (step 210). The collision avoidance path generator generates a collision avoidance path (step 212) and reports to the host computer a selected section C5 vertex as the collision avoidance vertex (step 214).

Collision Avoidance Path Generation Process

Figure 9:
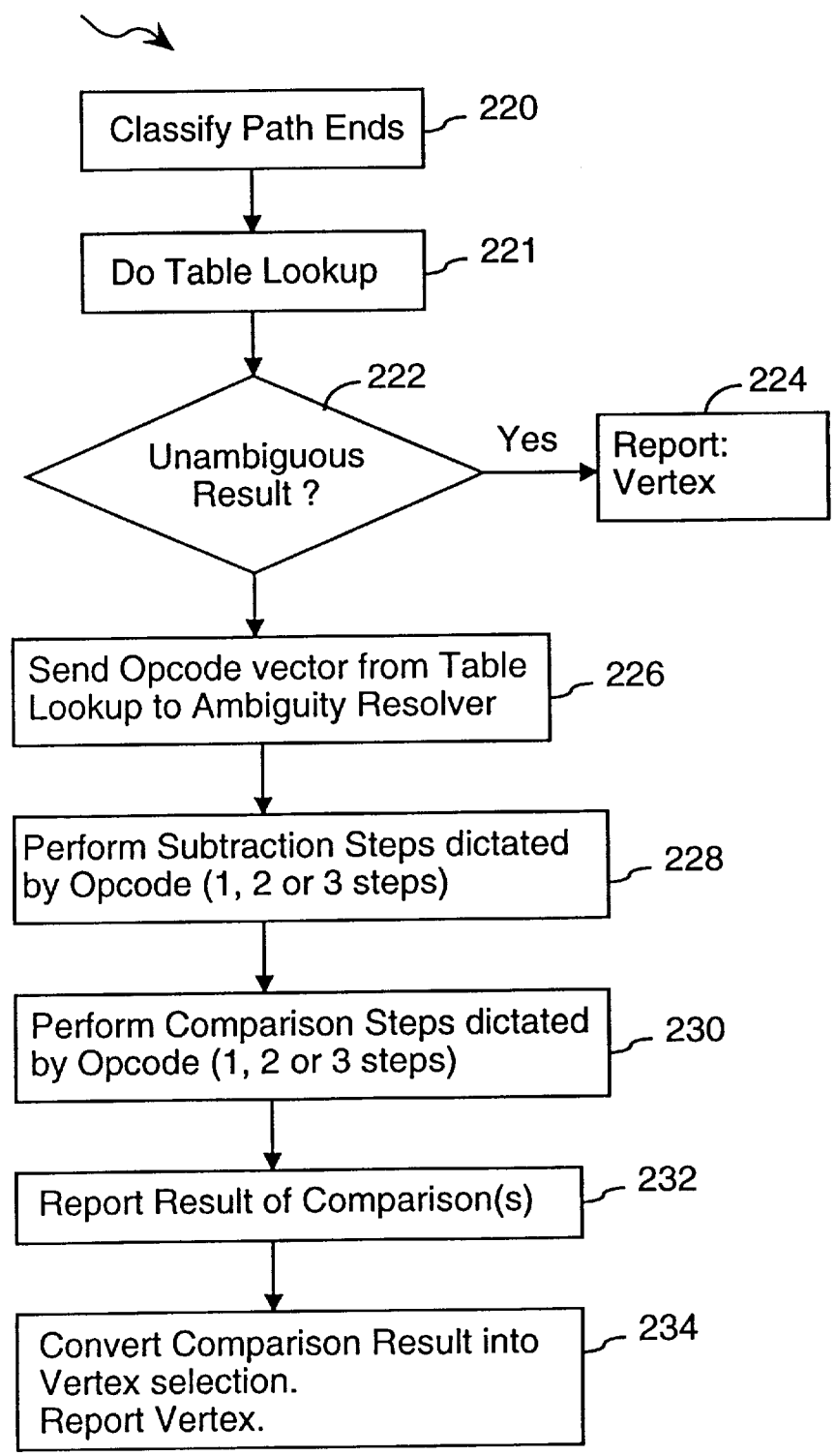
FIG. 9 is a flow chart of a collision avoidance path generation process.

Step 212, generating a collision avoidance path, is shown in more detail in FIG. 9. The first step is to classify each of the path ends to indicate which of the 27 sectors (shown in FIG. 2) that the path end is located in (step 220). When the path end classification method used by the collision avoidance path generator is the same as the path end classification method used by the collision detector, step 220 may be skipped and the path classification values obtained directly from the collision detector.

Using the A and B classification values, a table lookup in the vertex selector table is performed (step 221). If the table lookup produces an unambiguous vertex selection (step 222-Y), the selected vertex is reported to the host computer (step 224) and the collision avoidance path generation process is completed. Otherwise (step 222-N), the operation code obtained during the table lookup, and the coordinates of the specified path and obstacle are sent to the ambiguity resolver (step 226).

The ambiguity resolver, when using the preferred embodiment of the math unit shown in FIG. 7, performs one to three subtraction steps (step 228), followed by one to three comparison steps (step 230). The following are examples of the subtraction and comparison steps performed.

Example: Path A=F2 to B=C8:
Subtraction step 1:   $MX = (Xmax - Xmin)/2$
Comparison step 1: $AX \text{ LE } MX$
Example: Path A=F2 to B=B8:
Subtraction step 1:   $MX = (Xmax - Xmin)/2$
                     $MY = (Ymax - Ymin)/2$
                     $MZ = (Zmax - Zmin)/2$
Subtraction step 2:   $MX-AX$
                     $MY-AY$
                     $MZ-AZ$
Comparison step 1:   $(MY-AY \geq AZ-MZ) \text{ AND } (BX \leq MX)$
                     $(MY-AY \geq AZ-MZ) \text{ AND } (BX > MX)$
   (stop after comparison step 1 if either comparison result is True)
Comparison step 2:   $(MY-AY \geq AZ-MZ) \text{ AND } (BX \leq MX)$
                     $(MY-AY \geq AZ-MZ) \text{ AND } (BX > MX)$
Example: Path A=F1 to B=B9:
Subtraction step 1:   $MX = (Xmax - Xmin)/2$
                     $MY = (Ymax - Ymin)/2$
                     $MZ = (Zmax - Zmin)/2$
Subtraction step 2:   $MX-AX$
                     $MY-AY$
                     $MZ-AZ$
Subtraction step 3:   $BX-MX$
                     $BY-MY$
                     $BZ-MZ$
Comparison step 1:   $(MY-AY > BY-MY) \text{ AND } (MZ-AZ > BZ-MZ)$
                     $(MX-AX \leq BX-MX) \text{ AND } (MY-AY \leq BY-MY)$
   (stop after comparison step 1 if either comparison result is True)
Comparison step 2:   $(MX-AX > BX-MX) \text{ AND } (MY-AY > BY-MY)$
                     $(MZ-AZ \leq BZ-MZ) \text{ AND } (MX-AX \leq BX-MX)$
   (stop after comparison step 2 if either comparison result is True)
Comparison step 3:   $(MZ-AZ > BZ-MZ) \text{ AND } (MX-AX > BX-MX)$
                     $(MZ-AZ \leq BZ-MZ) \text{ AND } (MY-AY \leq BY-MY)$ Once the ambiguity resolver receives a True result from one of the comparisons performed by its math unit, it reports the results of the comparisons to the vertex result logic (232) by asserting a value representing the True comparison result on its Sel bus and asserting a ready signal on its Rdy line. The reported results are converted by the vertex result logic into a signal representing a selected collision avoidance vertex, and that signal is sent to the host computer (step 234). Alternately, steps 232 and 234 are combined and performed by the ambiguity resolver 156 (see FIG. 5). In particular, the results of the comparisons performed by the math unit are directly converted by the state machine logic 160 into a vertex selection, delivered as the Sel signal to the vertex result logic 154.

Alternate Embodiments

In an alternate embodiment, three dimensional space may divided into sectors for the purposes of classifying the specified path endpoints using a different number of sectors and a different space division scheme than the one described above. In general, for three dimensional collision avoidance problems, the number of space sectors will always be greater than nine. If the present invention is used to solve two dimensional collision avoidance problems, the number of space sectors will be at least five (i.e,. greater than four), and preferably nine, depending on the space division scheme being used.

As indicated earlier, the design of the collision avoidance path generator 110 can vary considerably from one implementation to another. For instance, it is assured that a fast collision detector will always "protect" the collision avoidance path generator 110 from receiving specified paths that (A) do not intersect the specified obstacle, or (B) that unavoidably intersect the obstacle, the design of the collision avoidance path generator 110 can be simplified. In particular the vertex selector table can be simplified, and since the number of non-empty entries is relatively small, the vertex selector table can be stored using convention sparse table storage techniques. Also, the vertex result logic 154 is simplified if the collision detector protects the collision avoidance path detector from receiving paths that do not require collision avoidance or for which a collision avoidance path cannot be generated.

Also as indicated earlier, the design of the ambiguity resolver and math unit can vary considerably from one implementation to another, depending in part on the tradeoffs between speed of operation and cost of implementation. In extremely high speed implementations, with a maximum amount of parallel computational circuitry in the ambiguity resolver 156, a collision avoidance vertex can be selected, even for worst case paths, in two system clock cycles (1 cycle for the classification and table lookup operations, and one for the ambiguity resolution operation that includes both numeric and boolean computations).

In an alternate embodiment, the ambiguity resolver 156 generates a sequence of two vertices, instead of just one, for the six paths where a collision cannot be avoided by traveling through a single vertex of sector C5. These six paths are the "face-face" paths: F5–B5, B5–F5, C2–C8, C8–C2, C4–C6 and C6–C4. For instance, in a simple implementation, the ambiguity resolver determines which vertex of the obstacle is closest to the start point A of the specified path, and then selects as the second collision avoidance path the corresponding vertex on the face of C5 facing the path end point B. For instance, for the path F5–B5, if the path start point A is closest to vertex f1, then the two vertices selected by the ambiguity resolver will be f1, b1. In this alternate embodiment, the "COL" operation code stored in the vertex selector table for paths F5–B5, B5–F5, C2–C8, C8–C2, C4–C6 and C6–C4, prompts the ambiguity resolver to select two of the possible eight vertices to form a collision avoidance path A-C-D-B, where C and D are the two vertices selected by the ambiguity resolver.

In this alternate embodiment, a specified path "unavoidably intercepts" the specified obstacle only when one of the two path endpoints is located inside the obstacle (i.e., in space sector C5).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 2

| Path Class | | Collision Avoidance Vertices | | | | | | | | Path End | | OP | IF | | ELSE |
|---|---|---|---|---|---|---|---|---|---|---|---|---|---|---|---|
| A | B | f1 | f3 | f7 | f9 | b1 | b3 | b7 | b9 | Types | | | | | |
| F1 | C6 | X | | o | | o | | | | V | F | NUL | | | |
| | C8 | | X | o | | | | o | | V | F | NUL | | | |
| | C9 | o | o | X | | o | o | | | V | E | NUL | | | |
| | B5 | | | | X | o | o | | | V | F | NUL | | | |
| | B6 | o | | | o | o | X | o | | V | E | NUL | | | |
| | B8 | | o | o | o | o | o | X | | V | E | NUL | | | |
| | B9 | X | | | | | | | | V | V | C1 | MY-AY G BY-MY AND MZ-AZ G BZ-MZ | | |
| | | | X | | | | | | | | | | MX-AX G BX-MX AND MY-AY G BY-MY | | |
| | | | | X | | | | | | | | | MZ-AZ LE BZ-MZ AND MX-AX LE BX-MX | | |
| | | | | | X | | | | | | | | MZ-AZ G BZ-MZ AND MX-AX G BX-MX | | |
| | | | | | | X | | | | | | | MX-AX LE BX-MX AND MY-AY LE BY-MY | | |
| | | | | | | | X | | | | | | MZ-AZ LE BZ-MZ AND MY-AY LEBY-MY | | |
| | C5 | | | | | | | | | | | COL | | | |
| | F2 | | | | | | | | | | | NOC | | | |
| F2 | C4 | X | | o | | o | | o | | E | F | NUL | | | |
| | C6 | | X | | o | | o | | | E | F | NUL | | | |
| | C7 | o | | X | o | o | | | | E | E | NUL | | | |
| | C8 | | | X | o | | | | | E | F | AXF9 | AX LE MX | | f9 |
| | C9 | X | | o | o | | | o | | E | V | NUL | | | |
| | B4 | o | | o | | X | o | | | E | E | NUL | | | |
| | B5 | | | | | X | o | | | E | F | AX3 | AX LE MX | | b3 |
| | B6 | o | | | | o | o | X | | E | E | NUL | | | |
| | B7 | X | | o | o | o | o | | | E | V | NUL | | | |
| | B8 | | X | o | o | o | | | | E | E | BY1 | MY-AY GE AZ-MZ AND BX LE MX | | |
| | | | | o | X | o | o | | | | | | MY-AY GE AZ-MZ AND BX G MX | | |
| | | | | o | o | X | o | | | | | | MY-AY L AZ-MZ AND BX LE MX | | |
| | | | | o | o | o | X | | | | | | MY-AY L AZ-MZ AND BX G MX | | |
| | B9 | | X | o | o | o | o | | | E | V | NUL | | | |
| F3 | C4 | X | | o | o | | | | | V | F | NUL | | | |
| | C7 | o | | X | o | o | | | o | V | E | NUL | | | |
| | C8 | | | o | X | | | | o | V | F | NUL | | | |
| | B4 | o | | o | | X | o | | o | V | E | NUL | | | |
| | B5 | | | | | o | X | | o | V | F | NUL | | | |
| | B7 | X | | | | | | | | V | V | C2 | MZ-AZ G BZ-MZ AND MX-AX G BX-MX | | |
| | | | X | | | | | | | | | | MZ-AZ LE BZ-MZ AND MY-AY LE BY-MY | | |
| | | | | X | | | | | | | | | MX-AX G BX-MX AND MY-AY G BY-MY | | |
| | | | | | X | | | | | | | | MX-AX LE BX-MX AND MY-AY LE BY-MY | | |
| | | | | | | X | | | | | | | MY-AY G BY-MY AND MZ-AZ G BZ-MZ | | |
| | | | | | | | X | | | | | | MZ-AZ LE BZ-MZ AND MX-AX LE BX-MX | | |
| | B8 | | | o | o | o | o | X | | V | E | NUL | | | |

TABLE 2-continued

| Path Class A | B | Collision Avoidance Vertices f1 | f3 | f7 | f9 | b1 | b3 | b7 | b9 | Path End Types | OP | IF | | ELSE |
|---|---|---|---|---|---|---|---|---|---|---|---|---|---|---|
| F4 | C2 | X | o | | o | | | | | E | F | NUL | | |
| | C3 | o | X | | o | o | | | | E | E | NUL | | |
| | C6 | | o | X | | | | | | E | F | AZF3 | AZ LE MZ | f3 |
| | C8 | | X | o | | | | o | | E | F | NUL | | |
| | C9 | | o | o | X | | | o | | E | E | NUL | | |
| | B2 | o | o | | | X | | o | | E | E | NUL | | |
| | B3 | X | o | | | o | o | o | | E | V | NUL | | |
| | B5 | | | | | | o | X | | E | F | AZ1 | AZ LE MZ | b1 |
| | B6 | | X | | | | | | | E | E | BX1 | MX-AX LE MY-AY AND BZ G MZ | |
| | | | | | X | | | | | | | | MX-AX LE MY-AY AND BZ LE MZ | |
| | | | | | | X | | | | | | | MX-AX G MY-AY AND BZ G MZ | |
| | | | | | | | X | | | | | | MX-AX G MY-AY AND BZ LE MZ | |
| | B8 | | | o | o | o | | X | | E | E | NUL | | |
| | B9 | | o | X | o | o | | o | | E | V | NUL | | |
| F5 | C1 | X | o | o | | | | | | F | E | NUL | | |
| | C2 | X | o | | | | | | | F | F | AXF3 | AX LE MX | f3 |
| | C3 | o | X | | o | | | | | F | E | NUL | | |
| | C4 | o | | X | | | | | | F | F | AZF1 | AZ LE MZ | f1 |
| | C6 | | o | | X | | | | | F | F | AZF3 | AZ LE MZ | f3 |
| | C7 | o | | X | o | | | | | F | E | NUL | | |
| | C8 | | X | o | | | | | | F | F | AXF9 | AX LE MX | f9 |
| | C9 | | o | o | X | | | | | F | E | NUL | | |
| | B1 | X | o | o | | | | | | F | V | NUL | | |
| | B2 | X | o | | | | | | | F | E | AXF3 | AX LE MX | f3 |
| | B3 | o | X | | o | | | | | F | V | NUL | | |
| | B4 | o | | X | | | | | | F | E | AZF1 | AZ LE MZ | f1 |
| | B5 | | | | | | | | | COL | | | | |
| | B6 | | o | | X | | | | | F | E | AZF3 | AZ LE MZ | f3 |
| | B7 | o | | X | o | | | | | F | V | NUL | | |
| | B8 | | X | o | | | | | | F | E | AXF9 | AX LE MX | f9 |
| | B9 | | o | o | X | | | | | F | V | NUL | | |
| F6 | C1 | X | o | o | | | o | | | E | E | NUL | | |
| | C2 | o | X | | | | o | | | E | F | NUL | | |
| | C4 | o | X | | | | | | | E | F | AZ1 | AZ LE MZ | f1 |
| | C7 | o | X | o | | | | | o | E | E | NUL | | |
| | C8 | | o | X | | | | | o | E | F | NUL | | |
| | B1 | o | X | o | | | o | | o | E | V | NUL | | |
| | B2 | o | o | | | X | | o | | E | E | NUL | | |
| | B4 | X | | | | | | | | E | E | BX2 | MX-AX LE AY-MY AND BZ G MZ | |
| | | | X | | | | | | | | | | MX-AX LE AY-MY AND BZ LE MZ | |
| | | | | | | X | | | | | | | MX-AX G AY-MY AND BZ G MZ | |
| | | | | | | | | | X | | | | MX-AX G AY-MY AND BZ LE MZ | |
| | B5 | | | | | o | | | X | E | F | AZ3 | AZ LE MZ | b3 |
| | B7 | o | | o | X | o | | o | o | E | V | NUL | | |
| | B8 | | o | o | | o | | | X | E | E | NUL | | |
| F7 | C2 | X | o | | o | | | | | V | F | NUL | | |
| | C3 | o | X | | o | o | | o | | V | E | NUL | | |
| | C6 | | o | X | | | | o | | V | F | NUL | | |
| | B2 | o | o | | X | | o | o | | V | E | NUL | | |
| | B3 | X | | | | | | | | V | V | C3 | MX-AX LE BX-MX AND MY-AY LE BY-MY | |
| | | | X | | | | | | | | | | MZ-AZ G BZ-MZ AND MX-AX G BX-MX | |
| | | | | | X | | | | | | | | MZ-AZ LE BZ-MZ AND MY-AY LE BY-MY | |
| | | | | | | X | | | | | | | MY-AY G BY-MY AND MZ-AZ G BZ-MZ | |
| | | | | | | | X | | | | | | MZ-AZ LE BZ-MZ AND MX-AX LE BX-MX | |
| | | | | | | | | X | | | | | MX-AX G BX-MX AND MY-AY G BY-MY | |
| | B5 | | | | | o | X | o | | V | F | NUL | | |
| | B6 | | o | | o | o | | o | X | V | E | NUL | | |
| F8 | C1 | X | o | o | | | o | | | E | E | NUL | | |
| | C2 | X | o | | | | | | | E | F | AXF3 | AX LE MX | f3 |
| | C3 | o | X | | o | | | o | | E | E | NUL | | |
| | C4 | o | | X | | | o | | | E | F | NUL | | |
| | C6 | | o | X | | | | o | | E | F | NUL | | |
| | B1 | o | o | X | | | o | o | | E | V | NUL | | |
| | B2 | o | o | | | | o | o | | E | E | BY2 | MY-AY GE AZ-MZ AND BX LE MX | |
| | | | | | | | | | | | | | MY-AY GE AZ-MZ AND BX G MX | |
| | | | | | | | | | | | | | MY-AY L AZ-MZ AND BX LE MX | |
| | | | | | | | | | | | | | MY-AY L AZ-MZ AND BX G MX | |
| | B3 | o | o | | X | | o | o | | E | V | NUL | | |
| | B4 | o | o | | | X | o | o | | E | E | NUL | | |
| | B5 | | | | | X | o | | | E | F | AX9 | AX LE MX | b9 |
| | B6 | | o | | o | o | | o | X | E | E | NUL | | |

TABLE 2-continued

| Path Class | | Collision Avoidance Vertices | | | | | | | | Path End | | | | |
|---|---|---|---|---|---|---|---|---|---|---|---|---|---|---|
| A | B | f1 | f3 | f7 | f9 | b1 | b3 | b7 | b9 | Types | OP | IF | | ELSE |
| F9 | C1 | X | o | o | | | o | o | | V | E | NUL | | |
|  | C2 | o | X | | | | o | | | V | F | NUL | | |
|  | C4 | o | X | X | | | | o | | V | F | NUL | | |
|  | B1 | X | | | | | | | | V | V | C4 | MY-AY G BY-MY AND MZ-AZ G BZ-MZ | |
|  |  |  | X |  |  |  |  |  |  |  |  |  | MX-AX LE BX-MX AND MY-AY LE BY-MY | |
|  |  |  |  | X |  |  |  |  |  |  |  |  | MZ-AZ LE BZ-MZ AND MX-AX LE BX-MX | |
|  |  |  |  |  |  |  | X |  |  |  |  |  | MZ-AZ G BZ-MZ AND MX-AX G BX-MX | |
|  |  |  |  |  |  |  |  | X |  |  |  |  | MX-AX G BX-MX AND MY-AY G BY-MY | |
|  |  |  |  |  |  |  |  |  | X |  |  |  | MZ-AZ LE BZ-MZ ANP MY-AY LE BY-MY | |
|  | B2 | o | o | | | X | o | o | | V | E | NUL | | |
|  | B4 | o | | o | | o | X | o | | V | E | NUL | | |
|  | B5 | | | | | o | o | X | | V | F | NUL | | |
| C1 | C6 | | X | | | | o | | | E | F | AY3 | AY LE MY | b3 |
|  | C8 | | | X | | | o | | | E | F | AY7 | AY LE MY | b7 |
|  | C9 | | X | | | | | | | E | E | BX3 | MX-AX L AZ-MZ AND BY LE MY | |
|  |  |  |  | X |  |  |  |  |  |  |  |  | MX-AX GE AZ-MZ AND BY LE MY | |
|  |  |  |  |  |  |  | X |  |  |  |  |  | MX-AX L AZ-MZ AND BY G MY | |
|  |  |  |  |  |  |  |  | X |  |  |  |  | MX-AX GE AZ-MZ AND BY G MY | |
|  | B5 | | | | | X | o | o | | E | F | NUL | | |
|  | B6 | | o | | | o | X | o | | E | E | NUL | | |
|  | B8 | | | o | | o | o | X | | E | E | NUL | | |
|  | B9 | | o | o | | X | o | o | | E | V | NUL | | |
| C2 | C4 | X | | | | o | | | | F | F | AY1 | AY LE MY | b1 |
|  | C6 | | X | | | o | | | | F | F | AY3 | AL LE MY | b3 |
|  | C7 | X | | | | o | | | | F | E | AY1 | AL LE MY | b1 |
|  | C9 | | X | | | o | | | | F | E | AY3 | AY LE MY | b3 |
|  | B4 | o | | | | X | o | | | F | E | NUL | | |
|  | B5 | | | | | X | o | | | F | F | AX3 | AX LE MX | b3 |
|  | B6 | | o | | | o | X | | | F | E | NUL | | |
|  | B7 | o | | | | X | o | | | F | V | NUL | | |
|  | B8 | | | | | X | o | | | F | E | AX3 | AX LE MX | b3 |
|  | B9 | | o | | | o | X | | | F | V | NUL | | |
| C3 | C4 | X | | | | o | | | | E | F | AY1 | AL LE MY | b1 |
|  | C7 | X | | | | | | | | E | E | BX4 | MX-AX L AZ-MZ AND BY G MY | |
|  |  |  |  |  | X |  |  |  |  |  |  |  | MX-AX GE AZ-MZ AND BY G MY | |
|  |  |  |  | X |  |  |  |  |  |  |  |  | MX-AX L AZ-MZ AND BY LE MY | |
|  |  |  |  |  |  |  |  |  | X |  |  |  | MX-AX GE AZ-MZ AND BY LE MY | |
|  | C8 | | | X | | | | o | | E | F | AY9 | AY LE MY | b9 |
|  | B4 | o | | | | X | o | | o | E | E | NUL | | |
|  | B5 | | | | | o | X | o | | E | F | NUL | | |
|  | B7 | o | | | | o | o | X | o | E | V | NUL | | |
|  | B8 | | | | o | o | o | | X | E | E | NUL | | |
| C4 | C8 | | X | | | | o | | | F | F | AY7 | AY LE MY | b7 |
|  | C9 | | X | | | | o | | | F | F | NUL | | |
|  | B2 | o | | | | X | o | | | F | E | NUL | | |
|  | B3 | o | | | | X | o | | | F | V | NUL | | |
|  | B5 | | | | | | o | X | | F | F | NUL | | |
|  | B6 | | | | | | o | X | | F | E | NUL | | |
|  | B8 | | | | | | o | X | | F | E | NUL | | |
|  | B9 | | o | | | o | | X | | F | V | NUL | | |
| C5 | any | | | | | | | | | C | any | COL | | |
| C6 | C7 | | | X | | | | | o | F | E | AY9 | AL LE MY | b9 |
|  | C8 | | | X | | | | | o | F | F | AY9 | AY LE MY | b9 |
|  | B1 | | o | | | X | | | o | F | V | NUL | | |
|  | B2 | | o | | | X | | | o | F | E | NUL | | |
|  | B4 | | | | | | o | | X | F | E | AZ3 | AZ LE MZ | b3 |
|  | B5 | | | | | | o | | X | F | F | AZ3 | AZ LE MZ | b3 |
|  | B7 | | | o | | o | | | X | F | V | NUL | | |
|  | B8 | | | o | | o | | | X | F | E | NUL | | |
| C7 | B2 | o | | | X | | o | o | | E | E | NUL | | |
|  | B3 | o | | o | o | | X | o | | E | V | NUL | | |
|  | B5 | | | | o | | X | o | | E | F | NUL | | |
|  | B6 | | | o | o | | o | X | | E | E | NUL | | |
| C8 | B1 | | o | | | X | | o | | F | V | NUL | | |
|  | B2 | | | | | X | o | | | F | E | AX9 | AX LE MX | b9 |
|  | B3 | | o | | | o | X | | | F | V | NUL | | |
|  | B4 | | o | | | X | o | | | F | E | NUL | | |
|  | B5 | | | | | X | o | | | F | F | AX9 | AX LE MX | b9 |
|  | B6 | | | o | | o | X | | | F | E | NUL | | |
| C9 | B1 | | o | | o | o | | X | | E | V | NUL | | |
|  | B2 | | o | | | X | o | o | | E | E | N | | |
|  | B4 | | o | | | o | X | o | | E | E | N | | |
|  | B5 | | | | | o | o | X | | E | F | N | | |

What is claimed is:

1. A path analyzer, comprising:

a collision detector for receiving coordinates representing a specified path's first and second endpoints (A, B) in three dimensional space and a specified obstacle's physical extent and for generating a preliminary result signal indicating whether the specified path does not intercept the specified obstacle, unavoidably intercepts the specified obstacle, or avoidably intercepts the specified obstacle; and a collision avoidance path generator, activated when the preliminary result signal indicates that the specified path avoidably intercepts the specified obstacle, the collision avoidance path generator including apparatus for selecting a vertex (C) of a predefined geometric shape corresponding to the specified obstacle's physical extent, such that a modified path A-C-B from the first specified path endpoint to the selected vertex to the second specified path endpoint circumnavigates the obstacle.

2. The path analyzer of claim 1, wherein the collision avoidance path generator includes:

a path endpoint classifier for classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 4; and a lookup table, addressed in accordance with the first and second path endpoint sector values, for returning a first vertex selection value; and the selected vertex corresponds to the returned first vertex selection value when predefined vertex selection criteria are satisfied.

3. The path analyzer of claim 1, wherein the collision avoidance path generator includes:

a path endpoint classifier for classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 9; and a lookup table, addressed in accordance with the first and second path endpoint sector values, for returning a first vertex selection value; and the selected vertex corresponds to the returned first vertex selection value when predefined vertex selection criteria are satisfied.

4. The path analyzer of claim 1, wherein the collision avoidance path generator includes:

a path endpoint classifier for classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 9;

a lookup table, addressed in accordance with the first and second path endpoint sector values, for returning a first vertex selection value and a return code, wherein the selected vertex corresponds to the returned first vertex selection value when the return code has a first predefined value; and an ambiguity resolver circuit, activated when the return code is any one of a predefined set of operation codes, each of which corresponds to a respective ambiguity resolution computation, for performing the ambiguity resolution computation corresponding to the return code returned by the lookup table so as to generate a second vertex selection value; wherein the selected vertex corresponds to the second vertex selection value when the return code is any one of the predefined set of operation codes.

5. The path analyzer of claim 4, wherein the ambiguity resolver circuit includes:

a math unit for performing mathematical and logical operations; and a state machine for directing the math unit to perform a sequence of mathematical and logical operations on values corresponding to the coordinates of the specified path endpoints and the specified obstacle's physical extent, the sequence of mathematical and logical operations corresponding to the return code returned by the lookup table.

6. The path analyzer of claim 5, wherein the predefined geometric shape is a parallelepiped surrounding the specified obstacle; and N is equal to 27 and the 27 sectors of space correspond to those shown in FIG. 2.

7. The path analyzer of claim 1, wherein the predefined geometric shape is a parallelepiped surrounding the specified obstacle.

8. A method of analyzing a path, comprising receiving from a host computer coordinates representing a specified path's first and second endpoints (A, B) in three dimensional space and a specified obstacle's physical extent;

generating a preliminary result signal indicating whether the specified path does not intercept the specified obstacle, unavoidably intercepts the specified obstacle, or avoidably intercepts the specified obstacle; and when the preliminary result signal indicates that the specified path avoidably intercepts the specified obstacle, selecting a vertex (C) of a predefined geometric shape corresponding to the specified obstacle's physical extent, such that a modified path A-C-B from the first specified path endpoint to the selected vertex to the second specified path endpoint circumnavigates the obstacle; and returning signals to the host computer representing the preliminary result signal and, when the preliminary result signal indicates that the specified path avoidably intercepts the specified obstacle, the selected vertex.

9. The path analysis method of claim 8, wherein the vertex selecting step includes classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 4;

addressing a lookup table in accordance with the first and second path endpoint sector values so as to retrieve a first vertex selection value;

wherein the selected vertex corresponds to the returned first vertex selection value wherein predefined vertex selection criteria are satisfied.

10. The path analysis method of claim 8, wherein
the vertex selecting step includes
    classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 9;
    addressing a lookup table in accordance with the first and second path endpoint sector values so as to retrieve a first vertex selection value;
wherein the selected vertex corresponds to the returned first vertex selection value wherein predefined vertex selection criteria are satisfied.

11. The path analysis method of claim 8, wherein
the vertex selecting step includes
    classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 9;
    addressing a lookup table in accordance with the first and second path endpoint sector values so as to retrieve a first vertex selection value and a return code;
    when the return code is any one of a predefined set of operation codes, each of which corresponds to a respective ambiguity resolution computation, performing the ambiguity resolution computation corresponding to the return code returned by the lookup table so as to generate a second vertex selection value;
wherein the selected vertex corresponds to the second vertex selection value when the return code is any one of the predefined set of operation codes.

12. The path analysis method of claim 11, wherein the ambiguity resolution computation performing step includes:
    directing a math unit, distinct from any mathematical computation circuitry in the host computer, to perform a sequence of mathematical and logical operations on values corresponding to the coordinates of the specified path endpoints and the specified obstacle's physical extent, the sequence of mathematical and logical operations corresponding to the return code returned by the lookup table.

13. The path analysis method of claim 12, wherein
the predefined geometric shape is a parallelepiped surrounding the specified obstacle; and
N is equal to 27 and the 27 sectors of space correspond to those shown in FIG. 2.

14. The path analysis method of claim 8, wherein the predefined geometric shape is a parallelepiped surrounding the specified obstacle.

15. A path analyzer, comprising:
a collision detector for receiving coordinates representing a specified path's first and second endpoints (A, B) in three dimensional space and a specified obstacle's physical extent and for generating a preliminary result signal indicating whether the specified path intercepts the specified obstacle; and
a collision avoidance path generator, activated when the preliminary result signal indicates that the specified path avoidably intercepts the specified obstacle, the collision avoidance path generator including apparatus for selecting a vertex (C) of a predefined geometric shape corresponding to the specified obstacle's physical extent, such that a modified path from the first specified path endpoint (A) to the second specified path endpoint (B) that passes through the selected vertex C circumnavigates the obstacle.

16. The path analyzer of claim 15, wherein
the collision avoidance path generator includes:
    a path endpoint classifier for classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 4;
    a lookup table, addressed in accordance with the first and second path endpoint sector values, for returning a first vertex selection value and a return code, wherein the selected vertex corresponds to the returned first vertex selection value when the return code has a first predefined value; and
    an ambiguity resolver circuit, activated when the return code is any one of a predefined set of operation codes, each of which corresponds to a respective ambiguity resolution computation, for performing the ambiguity resolution computation corresponding to the return code returned by the lookup table so as to generate a second vertex selection value; wherein the selected vertex corresponds to the second vertex selection value when the return code is any one of the predefined set of operation codes.

17. A method of analyzing a path, comprising
receiving from a host computer coordinates representing a specified path's first and second endpoints (A, B) in three dimensional space and a specified obstacle's physical extent;
generating a preliminary result signal indicating whether the specified path intercepts the specified obstacle; and
when the preliminary result signal indicates that the specified path avoidably intercepts the specified obstacle, selecting a vertex (C) of a predefined geometric shape corresponding to the specified obstacle's physical extent, such that a modified path from the first specified path endpoint (A) to the selected vertex to the second specified path endpoint (B) that passes through the selected vertex (C) circumnavigates the obstacle; and
returning signals to the host computer representing the preliminary result signal and, when the preliminary result signal indicates that the specified path avoidably intercepts the specified obstacle, the selected vertex.

18. The path analysis method of claim 17, wherein
the vertex selecting step includes
    classifying each of the first and second path endpoints with respect to the specified object so as to produce first and second path endpoint sector values, each sector value indicating which of N sectors of space, defined with respect to the specified object, the corresponding path endpoint is located in, where N is an integer larger than 4;
    addressing a lookup table in accordance with the first and second path endpoint sector values so as to retrieve a first vertex selection value and a return code;
    when the return code is any one of a predefined set of operation codes, each of which corresponds to a respective ambiguity resolution computation, performing the ambiguity resolution computation corresponding to the return code returned by the lookup table so as to generate a second vertex selection value;

wherein the selected vertex corresponds to the second vertex selection value when the return code is any one of the predefined set of operation codes.

* * * * *